July 3, 1934.  B. R. WELLINGTON  1,965,062
CALCULATING DEVICE
Filed Feb. 29, 1932  4 Sheets-Sheet 1

July 3, 1934.  B. R. WELLINGTON  1,965,062
CALCULATING DEVICE
Filed Feb. 29, 1932    4 Sheets-Sheet 2

Inventor,
Barrett R. Wellington,
by Roberts, Cushman & Woodbury
Attys.

July 3, 1934.  B. R. WELLINGTON  1,965,062
CALCULATING DEVICE
Filed Feb. 29, 1932   4 Sheets-Sheet 3

Inventor,
Barrett R. Wellington,
by Roberts, Cushman & Woodberry
Attys.

Patented July 3, 1934

1,965,062

UNITED STATES PATENT OFFICE 1,965,062

CALCULATING DEVICE

Barrett R. Wellington, Troy, N. Y.

Application February 29, 1932, Serial No. 595,690

25 Claims. (Cl. 235—61)

This invention relates to improved calculating apparatus adapted to facilitate the ready solution of a large variety of problems and affording answers having accuracy within sufficiently close limits to meet the ordinary requirements for engineering calculations or the like.

My Patent No. 1,851,744, dated March 29, 1932, and granted upon my copending application Serial No. 320,130, filed November 17, 1928, (now issued as Patent No. 1,851,744) shows apparatus of this general type which is particularly useful in solving of equations containing the cubes or higher powers of unknown quantities, such as equations having the form $$x^m \pm x^p = a.$$

The present invention not only provides means capable of readily solving equations of that type, but also of solving numerous other algebraic equations, and in addition provides for the solution of problems involving arithmetical relationships, such as addition, subtraction, multiplication and division;—the reduction of fractions to their lowest terms, etc., as well as the ready determination of trigonometric functions and relationships;—the determination of reciprocals and the solution of problems involving vector analysis. To permit these desirable results, I have provided an arrangement of fixed and movable elements which are suitably graduated to provide scales and are so interrelated as to afford numerous advantageous relationships between the various scales thus provided.

In a preferred arrangement, my calculating device comprises a large right triangle having its legs or vertical and horizontal sides suitably graduated to provide fixed scales, and having its graduated vertical side or scale provided with a slider to which a graduated hypotenuse is pivotally connected. In these respects the present invention provides a device similar to that of my above-identified copending application. If desired, the present device may also be provided with curved guides to engage a part projecting from the swinging hypotenuse to permit the ready solution of problems of the type represented by the formula $$x^m \pm x^p = a.$$

In accordance with the present invention, I preferably include with such a device, a pair of sliding scales which are graduated similarly to the fixed scales, and which are arranged in respective juxtaposition to the fixed scales. A small "square" with legs at right angles to each other is guided to move along a path which is fixed relatively to the fixed scales. The arms of the square preferably engage the sliding scales so that the latter may be moved out uniformly as a diagonal of the square is slid along a path which bisects the right angle of the main triangle. The diagonal of the square preferably is provided with indicia corresponding to the squares of the numbers which appear upon the horizontal and vertical scales.

If desired, the slider may be provided with suitable indications to show the angularity of the swinging hypotenuse, thus in effect forming a protractor.

It is possible with a device of this character to solve the major part of the problems which ordinarily are encountered in engineering or analogous fields. The combination of the small square and the large triangle results in a geometrical relationship of three similar right triangles, the sides of which have proportional values depending upon the angular position of the hypotenuse and the contacting point of the corner of the small square with the same. Thus, a large triangle is bounded by a side of the swinging hypotenuse and the horizontal and vertical lines defined by the fixed scales of the large triangle. A smaller triangle is defined by the upper part of the swinging hypotenuse, the horizontal leg of the small square and that portion of the vertical line measured by the fixed scale between this bar and the upper end of the hypotenuse. The third triangle is defined by that portion of the swinging hypotenuse between its point of contact with the corner of the small square and its point of intersection with the horizontal scale,—by the vertical leg of the small square, and by that portion of the horizontal scale between its point of intersection with the hypotenuse and its point of intersection with the vertical leg of the small square. The small square cooperates with the lower part of the vertical scale line and the adjoining end of the horizontal scale in enclosing a square whose area corresponds to the scale designation upon the diagonal of the small square at its point of intersection with the horizontal scale. Thus, the square area enclosed by the edges of the legs of the small square and the opposite portions of the fixed scale lines may be generically represented as $a^2$, the corresponding fixed vertical and horizontal scales each giving a reading to show the value of $a$ and the diagonal of the small square giving a reading directly to show the value of $a^2$.

The small triangle defined between the upper part of the hypotenuse, the horizontal leg of the vertical scale small square, and a portion of the vertical scale has a base $a$, and an altitude $b$, while the lower similar triangle has an altitude $a$ and a base which may be designated $c$. Employing these essential relationships, many algebraic relationships of the various triangles and the square may be employed to effect the solution of algebraic equations. If desired, a suitable curved guide may be provided to cooperate with a fixed point upon the swinging hypotenuse so that this hypotenuse may be employed in connection with the fixed vertical and horizontal scales to determine the mantissae of logarithms.

Figures 1, 2:
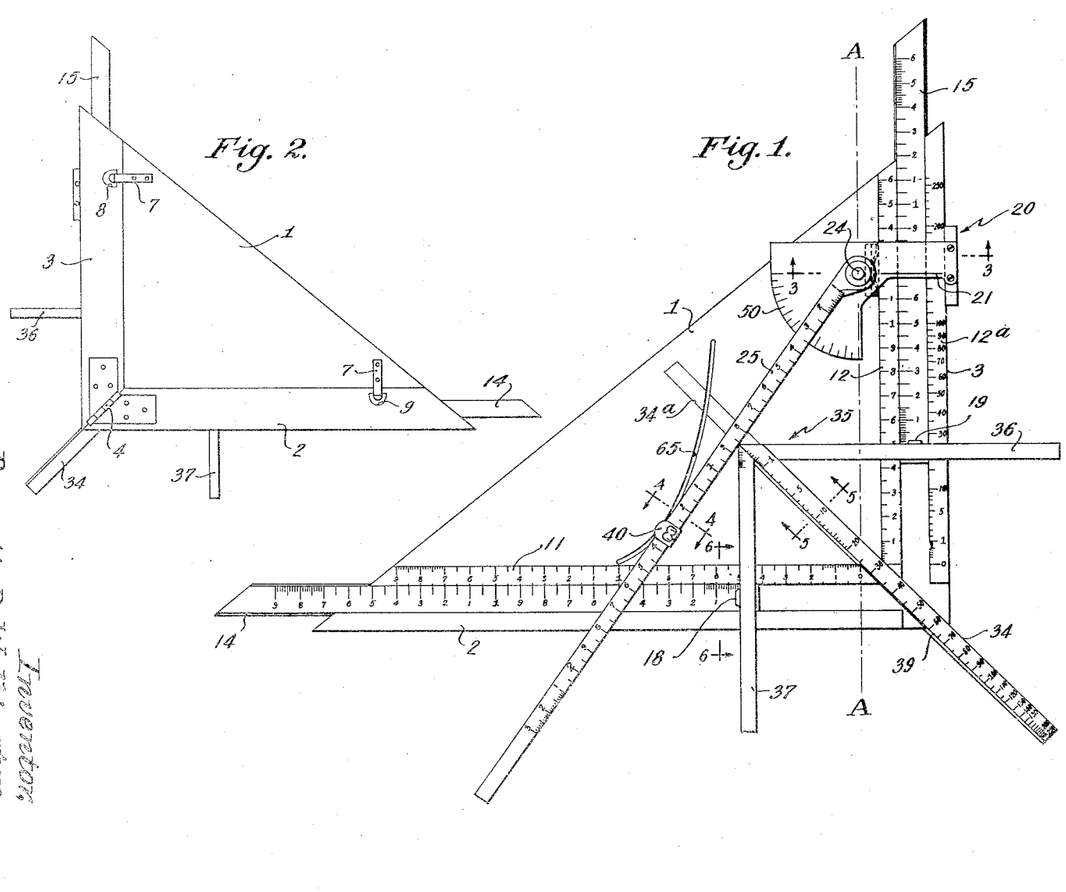
Fig. 1 is a plan view of a calculating device in which the principles of the present invention are embodied.
Fig. 2 is a bottom view of the device, to smaller scale.
Figure 3:
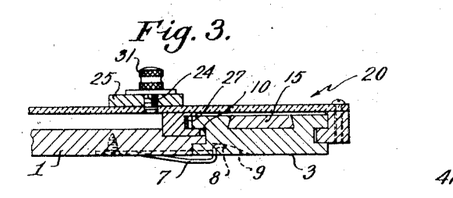
Fig. 3 is a section indicated by line 3—3 of Fig. 1.
Figure 7:
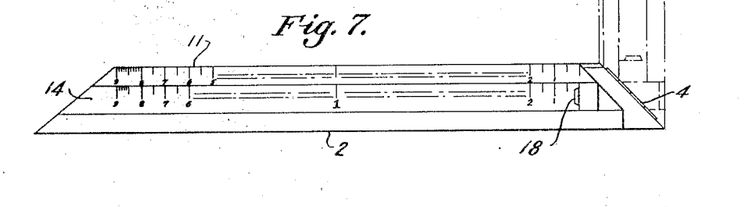
Fig. 7 is a plan view of a portion of the fixed and sliding scale assembly of the large triangle.
Figure 8:
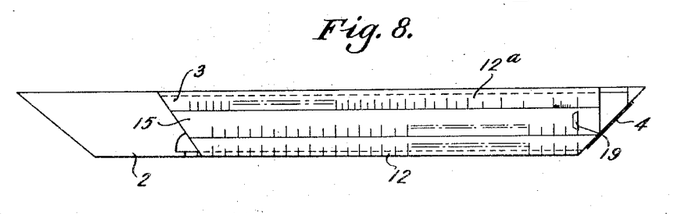
Fig. 8 is a plan view of the device of Fig. 6, folded for packing.

First, referring more particularly to Figs. 1 and 2, my improved calculating device preferably comprises a large and normally rigid triangle, that for convenience in packing or transportation may comprise the inner triangular member 1, which may be a plate of any desired rigid material, for example, wood, metal, or celluloid, and the leg portions 2 and 3 detachably secured to the edges of member 1 which are at right angles to each other. The ends of these legs preferably extend diagonally in alignment with the longer side or hypotenuse of the plate 1. The large frame or triangle is thus made up of three parts comprising the inner triangle portion 1 and the legs or scale sections 2 and 3, the latter being connected by a hinge 4 providing an axis along a line substantially bisecting the right angle at the corner of the device. As shown in Fig. 8, the legs or scale sections 2 and 3 may be folded in parallelism to each other to afford a flat unit. Fig. 7 shows in dot and dash lines the manner in which the scale sections may then be unfolded to extend at right angles to each other in the same plane. In this position they may be secured to the inner triangle 1 by spring clips 7 (Figs. 2 and 3) having end portions 8 engaging in recesses 9 (Fig. 3). In order to ensure the firm retention of the sections 1, 2 and 3 together, the edges of triangular section 1 may be rabbeted to provide tongue-like portions 5 engageable in grooves 10 in the leg sections 2 and 3 respectively (see Fig. 6). When in use the parts 1, 2 and 3 are thus held together to provide a triangular frame or base member.

The fixed scale section 2, as shown in Figs. 1 and 7, is provided with an upper scale, designated by numeral 11, having suitable graduations defining numerical divisions which afford a simple arithmetical scale with its zero end adjoining the right angle portion of the triangle 1. The vertical section 3 has a similar, correspondingly graduated scale 12 adjoining the triangle member 1 with its zero point adjacent to the right angle of this triangle. The scales 11 and 12 have their zero points spaced for a purpose which will later be explained, and these scales afford arithmetical measures of the dimensions of a triangle the base of which is provided by the upper edge of the scale 11 (or the upper edge of scale section 2) and the vertical leg of which is defined by an imaginary line, or scale line, (indicated in dot and dash lines in Fig. 1 and designated A—A) extending upwardly from the zero point of scale 11. Each of the scale sections 2 and 3 is provided with a sliding scale member which is graduated similarly to the fixed scale on the corresponding section. Thus the section 2 is provided with a sliding scale 14, and the section 3 is provided with a similar sliding scale 15, these scales being capable of sliding inwardly (as viewed in Fig. 1) until their diagonal ends are aligned with the diagonal side of triangular section 1. In this inner position their graduations register with corresponding graduations upon the fixed scales 11 and 12.

Figures 5, 6, 9:
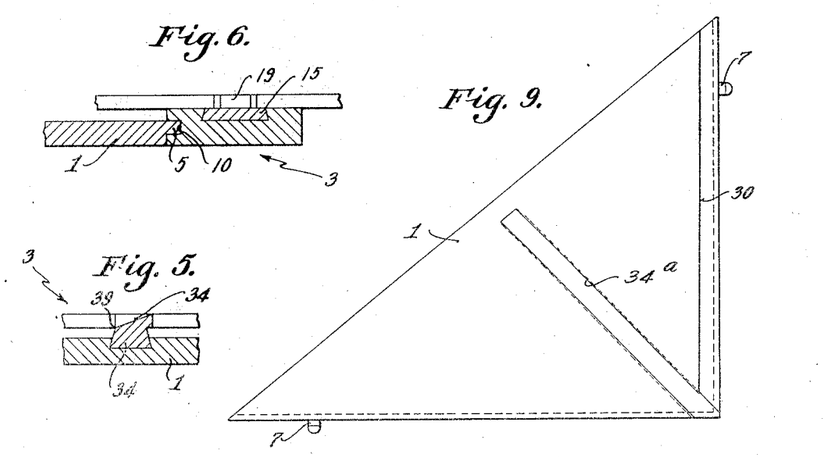
Fig. 5 is a section indicated by line 5—5 of Fig. 1.
Fig. 6 is a sectional detail on the line 6—6 of Fig. 1.
Fig. 9 is a plan view of one member of the large triangle assembly.

The mechanical arrangement of the sliding scale sections may be similar and of any suitable type. Thus, for example, as shown in Fig. 6, the side section 3 may be provided with an undercut groove receiving the beveled edged slide 15. Projecting lugs 18 and 19 are provided upon the ends of the scales 14 and 15, respectively, providing abutment elements disposed in the transverse planes of the zero scale graduations of the respective sliding scales.

A slider, designated in general by numeral 20, is arranged to slide along the vertical leg 3, and may be conveniently formed of translucent or transparent material so that readings may readily be made therethrough. This slider is provided with a horizontal index or hair line 21. A threaded pivot pin 24 is disposed with its axis at the intersection of the extension of the index line 21 and the line A—A above referred to.

A swinging hypotenuse bar 25 is pivotally connected to the slider by the pin 24 and is adapted to overlie the scales 11 and 14. The pivot pin 24 preferably is provided with a knurled head 31 (Fig. 3) to permit the clamping of the hypotenuse bar 25 in any desired angular position in relation to the vertical scale and slider 20. A suitable spring 27 may be disposed between the slider and the inner track member thereof, said spring engaging one leg of the channel 10 provided in the grooved edge of scale section 3. For this purpose the triangular plate 1 may have its vertical edge portion rabbeted, as designated by numeral 30, Fig. 9, to receive the inner track portion of the slide section.

The triangular member 1 is provided with a diagonal groove 34ᵃ (Fig. 9) which has spaced edges extending parallel to a line bisecting the right angle at its corner. This groove 34ª is undercut, as shown in Fig. 5, and slidably receives the diagonal member 34 of a small "square" or right angle member designated by numeral 35 (Fig. 1). This square is provided with a horizontal leg 36 and a vertical leg 37 to engage the lugs 18 and 19, respectively, of the sliding scales 14 and 15. The diagonal member 34 of the small square has an edge portion or line 39 which is disposed exactly along the line bisecting the right angle defined by the line A—A, and the upper edge of scale 11.

The diagonal member 34 is graduated to indicate the squares of the numbers upon the scales 11 and 12, the zero point of this scale being at the corner of the small "square" 35 and the reading of the square of a number being obtained at the point of contact of the line 39 with the end or zero point of horizontal scale 11. Thus in the position of the parts illustrated in Fig. 1, the vertical and horizontal legs of the small square 35 intersect the fixed vertical and horizontal scales 12 and 11, respectively, at their graduations 5, while the reading where the upper end of the zero graduation of the horizontal scale 11 contacts the edge 39 of the diagonal 34 is 25,— thus indicating the square of 5. The swinging hypotenuse 25 may be divided by suitable graduations, which are similar to the graduations upon the fixed scales 11 and 12, the zero point being at the center of the pin 24.

Figure 4:
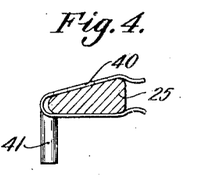
Fig. 4 is a section indicated by line 4—4 of Fig. 1.

For certain purposes I may provide a small slide 40, (Fig. 4) upon the swinging hypotenuse 25, this slide being provided with a depending guide pin 41 which may engage a suitable guide rib or groove provided upon or formed in the member 1 for purposes subsequently described.

The slider 20 may be provided with a protractor-like extension 50 which is graduated similarly to an ordinary protractor to show the angle between the inner edge of the hypotenuse 25 (that intersects the line 21 at the axis of pin 24) and the vertical line A—A. The outer portion of fixed scale-section 12 may be provided with a scale 12ª to indicate the squares of numbers upon the inner portion of this scale.

Figures 10, 11, 12, 13, 17, 18, 19, 20:
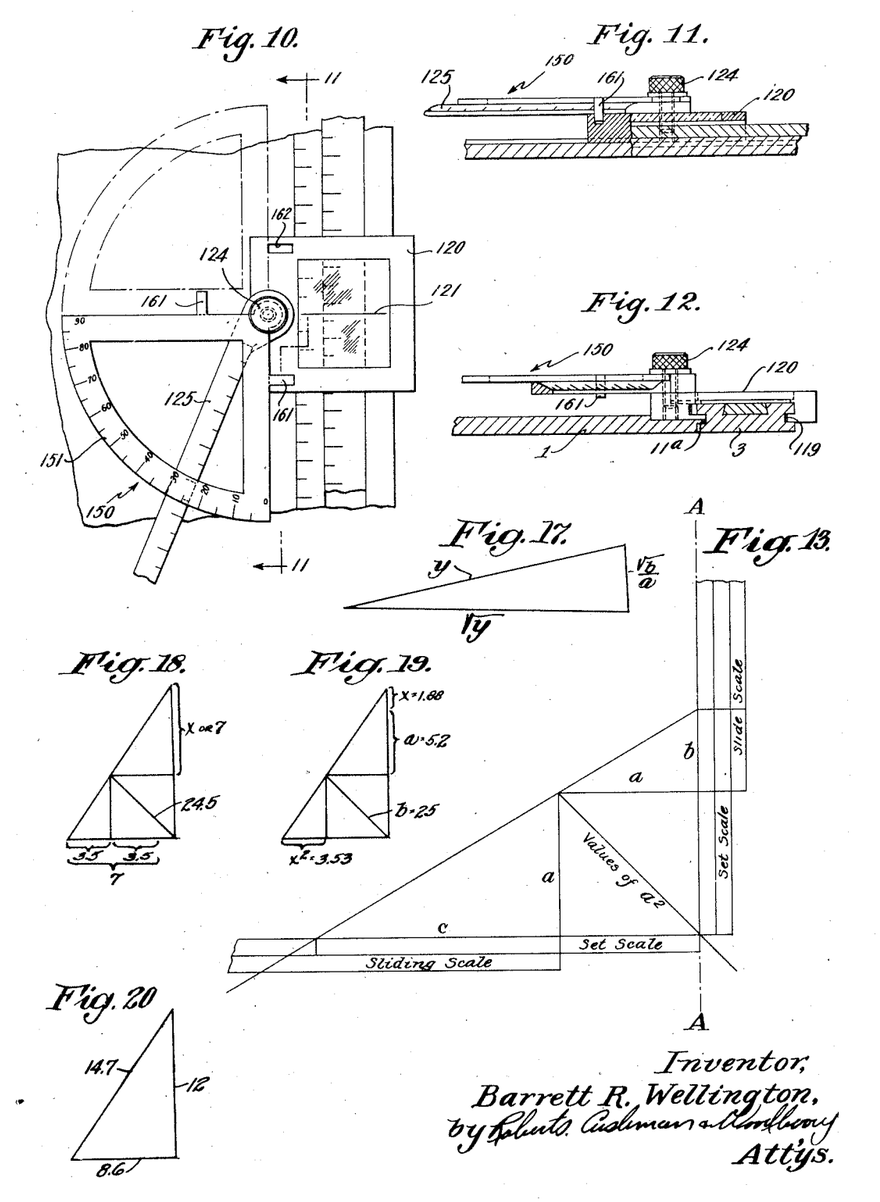
Fig. 10 is a fragmentary plan view of the protractor portion of the device, showing the same in relation to the slider and swinging hypotenuse, and indicating an optional form of protractor.
Fig. 11 is a section indicated by lines 11—11 of Fig. 10.
Fig. 12 is a view partly in section and partly in elevation of the assembly shown in Figs. 10 and 11.
Fig. 13 is a diagram illustrating certain geometrical relationships employed in the solution of problems.
Figs. 17 to 20, inclusive, are diagrams illustrative respectively of certain mathematical operations which may be performed by means of my improved apparatus.

Figs. 10, 11 and 12 show an optional slider and protractor arrangement wherein the slider 120 is in the form of a hollow rectangle having side portions with inwardly directed flanges which slide in grooves 119 of the vertical scale 3. The slider has an index or hair line 121 extending through the axis of the pivot pin 124 and perpendicular to the path of movement of the slider. The pivot pin 124 carries the swinging hypotenuse member 125 similar to the member 25. In this embodiment of the invention, the 90° protractor 150 may be of customary form, with legs at right angles to each other and an arcuate portion 151 provided with graduations to designate angles. This protractor, however, is detachably secured to the slider 120, having projections 161 received in either one of two recesses 162 in the rectangular frame of slider 120 and having a perforated ear at its corner adapted to receive the pivot pin 124. Thus the protractor may be located in either the full line position of Fig. 10 or in the dotted line position, as desired, or it may be detached by removing the thumbscrew on pin 124.

Figures 14, 15:
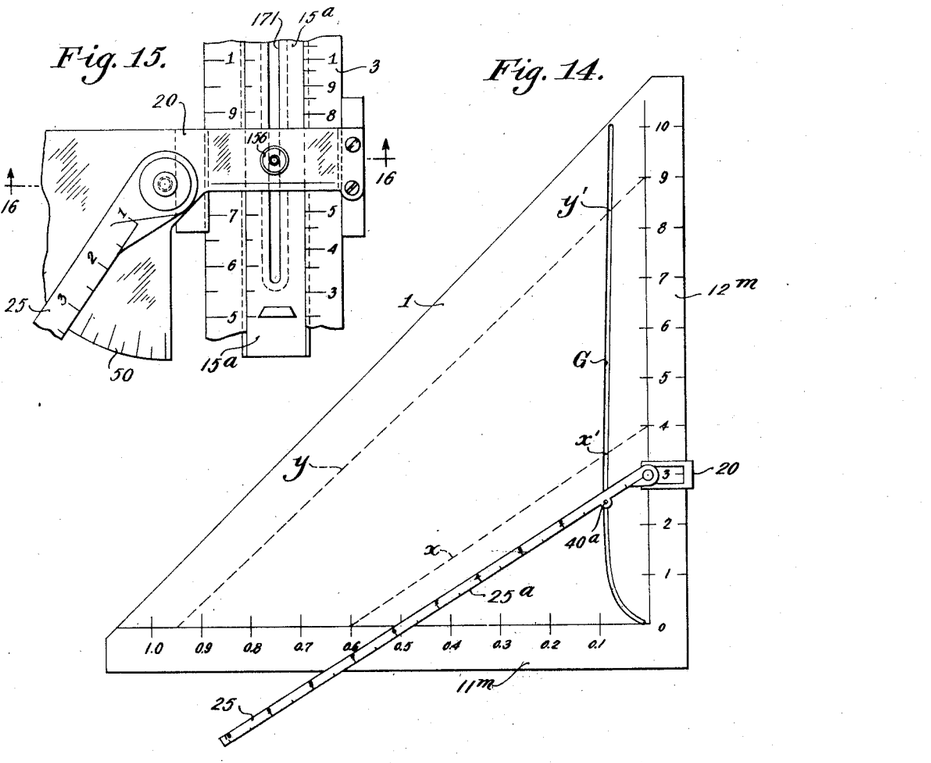
Fig. 14 is a diagrammatic plan view of the apparatus as arranged for determining the mantissae of logarithms.
Fig. 15 is an elevational detail of an optional arrangement of the sliding vertical scale and slider.
Figure 16:
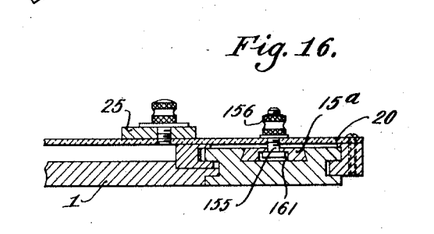
Fig. 16 is a section on line 16—16 of Fig. 15.

Figs. 15 and 16 illustrate an arrangement in general similar to that in Fig. 1 and including a similarly arranged slider 20 with a protractor extension 50 and a swinging hypotenuse 25. These figures, however, illustrate means which may be provided to permit the sliding scale 15ª to move with the slider 20, when desired. The scale 15ª may be similar to the scale 15 with the exception that it is provided with a longitudinal slot 171 and with a groove afforded by the rabbeted sides of the slot upon the lower face of the scale 15ª. A clamping bolt 155 has its head received in this groove, and a clamping nut 156 when tightened secures the scale 15ª in firm engagement with the slide 20. Ordinarily, however, the nut 156 may be loosened so that relative movement between slide 20 and scale 15ª may readily occur, and so that, for example, the scale 15ª may move in response to the movement of the square 35.

In use, a device of this character presents a system of three similar right triangles which may be varied in size and which may have their smaller, supplemental angles varied as desired. This relationship is shown in Fig. 13 wherein one right triangle has an altitude or vertical leg on line A—A, the length of which is measured by the reading of the hair line 21 at its intersection with the vertical scale 12. This triangle has a hypotenuse, the length of which is read by means of the scale upon the swinging hypotenuse 25 at the intersection of this scale with the upper edge of the horizontal scale 11. This triangle has a base, the length of which is read on scale 11 at its intersection with the inner edge of the hypotenuse 25. Within this large outer right triangle are two smaller and similar triangles. One of these triangles, as shown in Fig. 13, has a horizontal leg defined by the upper edge of leg 36 of square 35; its hypotenuse is defined by a portion of the inner edge of hypotenuse member 25; and its vertical leg is defined by the portion of line A—A between its base and the axis of pin 24. The length of the vertical leg of this smaller triangle may be directly obtained by reading the point of intersection of the hair line 21 upon the sliding scale 15.

The third triangle has a vertical side defined by the outer edge of the vertical leg 37 of small square 35; its base is defined by the upper edge of the scale 11; and its hypotenuse is defined by a portion of the inner edge of the hypotenuse 25. The length of the base of this triangle may be determined by a reading upon either the scale 11 at the intersection of its upper edge with the inner edge of hypotenuse 25 or directly below this point on the scale 14. The square 35 cooperates with the edge of scale section 11 and line A—A, in enclosing a square, the area of which is indicated by the reading, upon the edge 39 of diagonal member 34, at its point of contact with the inner end or zero point of scale 11. Thus, as shown in Fig. 13, the square thus defined may be considered to have an area $a^2$, the value of $a^2$ being readily ascertainable by a reading from the scale upon diagonal 34, and the value of $a$ being determined by a reading upon either scale 11 or scale 12 at the point of intersection of either of said scales with the outer edge of the corresponding leg of the square 35. The upper small triangle thus has a horizontal leg with a dimension $a$, and a vertical leg which is generically designated by symbol $b$, the length of which is readily determined by the reading upon sliding scale 15 registering with the hair line 21. The other small triangle has a vertical leg with a dimension $a$ and a horizontal leg with a dimension herein denoted by the character $c$, which may be determined by a reading taken either upon the scale 11 or the scale 12, having in mind that this reading indicates the distance between the intersection of leg 37 with the scale 11 and the point of intersection of the inner edge of swinging hypotenuse 25 with the edge of scale 11. The largest triangle has a base which is equal to $a+c$ and has an altitude or vertical leg which is equal to $a+b$, the hypotenuse of this triangle having a length equal to the $$\sqrt{2a^2+2ac+2ab+b^2+c^2}$$

which may be directly read upon the scale of the hypotenuse 25 at its intersection with the upper edge of scale 11.

The device as hereinabove described may be employed to solve a wide variety of arithmetical, algebraic and trigonometrical problems. In order to afford an understanding of the utility of such a device, I shall describe typical calculations which may be made to avoid loss of time and unnecessary mental effort, although many other calculations besides those described herein may also be performed.

Addition or subtraction may readily be performed by sliding the scale 15 in relation to the scale 12 (or by sliding the scale 14 in relation to the scale 11). Thus, for example, the scale 15 is in a position to show the sum of 5 as read upon the scale 12 and 7 as read upon the scale 15, the sum 12 being read at the intersection of line 21 with scale 12. These numbers are similarly in a position to show the difference between 12 and 7;—12 being read upon the scale 12;—7 being read upon scale 15;—and the difference or answer being read upon the scale 15 at the intersection of the edge of bar 36 with the latter.

Multiplication and division may be performed in at least three different ways, the first two methods depending upon movement of the hypotenuse 25 into two different but parallel positions wherein it cooperates with the side A—A of the large triangle, and the side defined by the upper edge of scale 11, respectively. Thus if multiplication is to be performed according to the first method, the hypotenuse 25 is moved so that its inner edge intersects the graduation 1 upon the horizontal scale 11, and so that the hair line 21 overlies a graduation of scale 12 corresponding to one of the factors to be multiplied. The hypotenuse is then firmly clamped to the slider 20 and is moved until its inner edge intersects the upper edge of scale 11 at a point corresponding to the other factor to be multiplied. The answer or product will then be found upon the scale 12 beneath the hair line 21.

Division may be performed by this method in a reverse manner by setting the hair line over the dividend upon the scale 12 and swinging the hypotenuse so that its inner edge intersects the point corresponding to the divisor on the scale 11. The hypotenuse is then clamped firmly to the slide and moved until the hair line 21 lies over the division 1 upon the vertical scale 12, whereupon the quotient may be read upon horizontal scale 11 at the intersection of the hypotenuse therewith.

Another method of multiplication involves moving the slider 20 until the hair line overlies the marking 1 upon the vertical scale 12, then setting the hypotenuse at such an angle that one factor is indicated on the scale of the hypotenuse at its intersection with the upper edge of scale 11; then clamping the hypotenuse in place and moving the slider until the hair line overlies the other factor, whereupon the product may be read upon the hypotenuse scale at its intersection with the upper edge of scale 11. This method may be reversed to permit division by sliding scale 20 so that the hair line overlies the divisor, and then swinging the hypotenuse until the dividend is indicated on its scale at the intersection with scale 11. The hypotenuse is then clamped to the slider and moved until the hair line overlies the division 1 on the vertical scale. The quotient is then read from the hypotenuse scale at its intersection with scale 11. Obviously rather than clamping the hypotenuse in fixed angular relation to the side in performing multiplication or division, the protractor may be observed to permit similar angular settings of the hypotenuse in different vertical positions of the slider. Thus the protractor may be conveniently employed in conjunction with the other elements in performing such mathematical operations.

A third method of multiplying or dividing may be more readily understood with reference to Fig. 13, where it is evident that similar triangles give the equation $$\frac{b}{a}=\frac{a}{c} \text{ or } bc=a^2.$$

With this arrangement the factors to be multiplied are read as follows: One factor is read on sliding scale 15 at the intersection of the hair line 21 therewith. The other factor is read on the scale 14 at the point which is directly below the intersection of the inner edge of the hypotenuse with scale 11. Thus in the position of the parts shown in Fig. 1, one factor is indicated by the position of the hair line 21 on sliding vertical scale section 15 as 7, while the other factor, read on scale 14, is substantially 3.6. The product is read on the diagonal 34 at the intersection of the graduated edge of the latter with the zero point of scale 11, the product being substantially 25. The same general arrangement of the parts and scales may be employed to perform division in any one of several ways.

The same general relationship of the smaller triangles may be taken advantage of readily to determine the reciprocals of numbers. For this purpose the square 35 is moved until the outer edges of its legs intersect the graduations corresponding to unity upon the horizontal and vertical fixed scales. Thus $$a=1 \text{ and } \frac{b}{1}=\frac{1}{c},$$

and the readings $b$ and $c$ upon the respective sliding scales will give the values of numbers and their reciprocals, proper attention, of course, being paid to the decimal relationship of the various factors.

Obviously the square or square root of a number may readily be ascertained by the scales 12 and 12$^a$ or by the employment of the diagonal 34 of small square 35, together with either the fixed vertical, or fixed horizontal scale, as may be more convenient. For example, if the square of a number is desired, the small square 35 is positioned so that the outer edges of its legs 36 and 37 register with graduations corresponding to this number upon the vertical or horizontal fixed scales, respectively. The square of the number is then read from the diagonal 34 at the intersection of its edge 39 with the end of scale 11. Thus in the position of the parts shown in Fig. 1, the square of 5 is shown to be 25. Similarly, if the square root of a number is desired, the scale 35 is positioned so that the graduation upon scale 34, corresponding to this number, is positioned at the point of contact with the zero end of scale 11, thereupon the square root may be read either at the intersection of the upper edge of leg 36 with the vertical scale 12, or at the intersection of the outer edge of leg 37 with scale 11.

Reduction of fractions to their lowest terms may be easily done with this apparatus in the following manner: The slider 20 is set to indicate the value of the numerator on vertical scale 12,— the hypotenuse is then swung until it intersects a value on the horizontal scale 11 equal to the denominator. The hypotenuse is clamped to the slide 20 in this position and then the slider is moved downwardly until the smallest pair of whole numbers is indicated by the intersection of the hair line 21 with the vertical scale and the intersection of the inner edge of the hypotenuse with the horizontal scale. Obviously, this process involves a comparison of similar triangles.

The provision of the protractor 50 permits the employment of this apparatus to indicate trigonometric relations. Thus, for example, the hypotenuse is clamped upon the slider 20 so that its inner edge overlies the graduation upon protractor scale indicating the selected angle, the functions of which are desired. After the hypotenuse is thus clamped to the slider, the latter is slid upon the vertical scale 12 until the upper edge of scale 11 intersects unity or the graduation designated 1 on the hypotenuse scale. The reading on the horizontal scale 11 then corresponds to the sine of the angle between the hypotenuse and line A—A. The reading upon the vertical scale 12 beneath hair line 21 then corresponds to the cosine of this angle, and the ratio of the reading upon the horizontal scale to that upon the vertical scale gives the tangent of the angle. The functions of the angle between scale 11 and the hypotenuse are the co-named functions of those of the angle upon the protractor. Thus the cosine of this angle is the reading upon the horizontal scale, and its cotangent is equal to the reading of the vertical divided by the reading of the horizontal scale.

This device is especially convenient for the solving of problems involving vector analysis. Ordinarily such solutions involve the resolving of various factors into components at right angles to each other. These components may be readily added and subtracted by employing the fixed and sliding vertical and horizontal scales and the net resultants of the components at right angles to each other may be ascertained from a reading upon the swinging hypotenuse 25.

A device of this type is particularly advantageous in solving certain relationships which may be stated algebraically, for example, by the formula $$\frac{a^2}{d-a}=x.$$

Referring to Fig. 13, $d$ may equal $a+b$ so that $$\frac{a^2}{d-a}=\frac{a^2}{b}.$$

As previously explained, $$\frac{b}{a}=\frac{a}{c}$$

and $bc=a^2$, or $$\frac{a^2}{b}=c;$$

therefore $$\frac{a^2}{d-a}$$

must equal $c$. In employing the device to obtain the solutions of such problems, the slider 20 is moved until it indicates the value of $d$ on scale 12, and the small square 35 is moved until the intersection of the scale line 39 thereon with the zero point of the scale 11 indicates the square of $a$. The value of $d-a$ may then be obtained from the reading of the sliding vertical scale under the hair line of slider 20. The point upon scale 14 directly under the intersection of the hypotenuse scale with the edge of scale 11 then gives the value of $x$. Thus in the position of the parts shown in Fig. 1, $d=12$, $$a^2=25,\ a=5$$

and the value of $$\frac{a^2}{d-a}$$

is substantially 3.6 as read on scale 14, this being equal to 25 divided by 7

$$(d-a=7).$$

A device of this type may also be readily employed to solve a relationship which may be stated algebraically by the formula $$\frac{d}{\sqrt{d}+e}=x.$$

Referring to Fig. 13, $d$ may equal $a^2$ and $$\sqrt{d}=a.$$

The square 35 therefore is set with its diagonal 34 arranged to intersect the scale 11 to indicate $d$ and with its legs 36 and 37 intersecting the scales 11 and 12 to indicate $$\sqrt{d}.$$

The slider 20 is then moved upwardly so that the distance from the horizontal leg of the square to the hair line 21 equals $$\sqrt{d}+e,$$

the reading being made on sliding scale 15. Thus, as shown by Fig. 13

$$\sqrt{d}+e=b,$$

and since $$a^2=bc,$$

and $$\frac{a^2}{b}=c,$$

($a^2$ being equal to $d$, and $b$ being equal to $$\sqrt{d}+e),$$

therefore $$\frac{a^2}{b}=c,$$

or $$\frac{d}{\sqrt{d}+e}=c.$$

Therefore the answer is afforded by the graduation on scale 14 which is directly below the intersection of the inner edge of hypotenuse 25 with the upper edge of scale 11.

The ascertainment of the positive roots of four-term cubic and biquadratic equations may be effected by this device by first reducing such equations to three-term equations by grouping two of the $x$-terms and a part of the known terms so as to form a certain square. To illustrate:

$$x^4+x^2+2x-.44=0$$
$$x^4+x^2+2x=.44$$
$$(x^4)+(x^2+2x+1)=1.44$$

The sides of a right triangle to which the grouped terms refer are $x^2$, $x+1$ and 1.2, respectively.

The sliding horizontal scale may then be moved to the left so that its zero-mark is opposite the one-mark on the fixed scale 11 and the hypotenuse 25 so adjusted that the square root of the reading on the upright scale 12 equals the reading on the horizontal sliding scale 14, the reading upon the horizontal sliding scale below the intersection of the lower edge of hypotenuse 25 with the upper edge of scale 11 then giving the value of $x$.

A device of this type may also be employed to solve simple quadratic equations. For this purpose a curved guide track 65 may be provided on the triangular member 1 to engage the pin 41 of the slide 40, the curvature of this track having been laid out in accordance with the method fully explained in my Patent No. 1,851,744. The present construction, wherein the plate 1 is detachably united to the scale members 2 and 3, makes it readily possible to provide a series of interchangeable plates, each having a different guide 65 (or group of such guides) having different upper limits of the constant term of the equation of the type to be solved. However, instead of employing such a curve, an equation of this type may be solved in the following manner by employing this device to perform the various operations in the manner explained above.

Assuming that
$$x^2 + ax = b,$$
and completing the square,—
$$x^2 + ax + \frac{a^2}{4} = b + \frac{a^2}{4}$$
$$x + \frac{a}{2} = \sqrt{b + \frac{a^2}{4}}$$
$$x = \sqrt{b + \frac{a^2}{4}} - \frac{a}{2}$$
$$= \frac{\sqrt{4b + a^2}}{2} - \frac{a}{2}$$
$$= \frac{\sqrt{4b + a^2} - a}{2}$$

Obviously the above value may be determined by the use of this apparatus by a series of operations comprising in succession squaring, addition, extraction of the square root, subtraction, and division by 2.

While the result may thus be obtained by a series of operations, it is preferable to use a predetermined curve in the solution of such problems, the theory of procedure in the use of the curve being as follows:

Let it be assumed that the equation
$$x^2 - ax = b$$
is to be solved:
Let
$$x = py$$
$$p^2y^2 - apy = b$$
$p$ is so selected that $p^2 = ap$
and
$$p = a$$
so, in the equation
$$x^2 - ax = b,$$
let
$$x = ay$$
Then,
$$a^2y^2 - a^2y = b$$
$$y^2 - y = \frac{b}{a^2}$$

The triangle to which this refers is illustrated in Fig. 17.

After the setting
$$\frac{\sqrt{b}}{a}$$
is made, the reading of the hypotenuse is multiplied by $a$ (since $x = ay$) and the value of $x$ obtained.

A simple method (not requiring a special curve) of solving the quadratic equation
$$x^2 - ax - b = 0$$
will now be briefly described without going into a detailed discussion of the reasons for making the various settings. The square 35 may be set so that $b$ is read at the intersection of diagonal 34 with line A—A, and one of the sliding scales, as the scale 14, moved until $a$ is read on that scale at its intersection with the outer edge of the corresponding arm, as the arm 37, of square 35. The other sliding scale is maintained in the same relative position with the corresponding arm of the square, as illustrated in Fig. 1. The reading upon each sliding scale corresponding to the point of intersection of the hypotenuse with the corresponding side of the large triangle will give the value of $x$ when the hypotenuse is so adjusted that both of the "$x$" readings are equal. For example, let it be assumed that
$$b = 24.5$$
and
$$a = 3.5.$$

The parts of my device are set in the manner indicated above and the position of the readings giving the various values is shown in Fig. 18, $x$ having a value of 7 for the assumed values of $a$ and $b$.

Various other methods may also be employed to solve equations of this general type.

The same general method of procedure may be varied to solve numerous cubic equations. Assume that the equation
$$x^3 + ax^2 - b = 0$$
is to be solved for $x$. This equation might be changed to read
$$x^2(x + a) = b.$$

The hypotenuse of the square 35 is then set to give a reading of $b$; $a$ is measured off by a sliding scale on one of the sides of the large triangle 1 and then the hypotenuse is set so that it affords a reading of $x$ beyond the reading of $a$ on that side of the triangle, and a reading of $x^2$ beyond the leg of the square 35 on the other edge of the triangle. For example, assume that
$$a = 5.2$$
and
$$b = 25.$$

Fig. 19 illustrates the relative position of the parts of my device, the value of $x$ being found to be approximately 1.88 and of $x^2$, 3.53. The hypotenuse is then adjusted so that the distance between its edge and the leg 37 gives a reading equal to the square of the distance from the 5.2 reading on scale 15 to the reading indicated by line 21. Thus $x^2$ as read on scale 14 is equal to substantially 3.6, and
$$x = 7 - 5.2 \text{ or } 1.8.$$

This device may also be employed for the convenient solution of various types of simultaneous equations, for example, assume that the following equations are to be solved for $x$ and $y$:

$$x+y=a$$
$$x^2+y^2=b$$

A length corresponding to $$\sqrt{b}$$

is measured off on the hypotenuse 25 and that hypotenuse is manipulated so that the sum of the two sides of the large triangle may equal $a$. Referring to the setting of the parts illustrated in Fig. 1 and employing only approximate values, let it be assumed that $$a=20.6$$

and that $b=216$ and $$\sqrt{b}=14.7;$$

the distance equal to $$\sqrt{b},$$

namely, 14.7, is measured off on hypotenuse 25; the latter is maneuvered until the sum of the readings on horizontal scale 11 and vertical scale 12 are equal to $a$ or 20.6. Thus, the horizontal reading equals 8.6 and the vertical reading equals 12 or a total of 20.6. The horizontal reading of the scale 11 thus gives a value of one of the unknown quantities, approximately 8.6, while the vertical reading on scale 12 gives the value of the other quantity, namely 12. Thus $x$ may be equal to 8.6 and $y$ may be equal to 12, or vice versa. Fig. 20 illustrates the values afforded by such a setting.

Various involved expressions may also be solved by following methods of the same general type as have been described. For example, assume that the equation $$x=\sqrt{A^2+B^2}$$

is to be solved. A may be measured off on one of the fixed scales of the large triangle and B on the other fixed scale. Then the hypotenuse extending between these readings will afford a direct reading of the $$\sqrt{A^2+B^2}.$$

Thus, employing approximate values and referring to the setting illustrated in Fig. 1, let $$A=12$$

and $$B=8.6.$$

The hypotenuse, being set to complete a triangle with sides of these dimensions, affords a reading of approximately 14.7, which gives the approximate value of $x$.

If it is desired to solve such an equation as $$x=\sqrt{(A-B)^2+C^2},$$

the same general procedure may be followed. For example, the value of C may be read along one fixed scale upon the large triangle and the value of A−B may be read on the other leg of the triangle. Then the hypotenuse intersecting the scales at the points of these readings gives a direct indication of the value of $x$ or of $$\sqrt{(A-B)^2+C^2}.$$

Again referring to the setting illustrated in Fig. 1 and employing approximate values, let it be assumed that $$A=14,$$

that $$B=2,$$

and that $$C=8.6.$$

The hypotenuse is set to intersect the horizontal scale 11 at the point corresponding to 8.6, while B is subtracted from A;

$$14-2=12$$

and the other end of the hypotenuse is set so that the line 21 is over the marking for 12 on scale 12. Then hypotenuse 25 gives a direct reading for the value of $x$, namely 14.7.

In Fig. 14 the device is shown as arranged for determining the mantissae of the logarithms of numbers. For this purpose the fixed horizontal scale $11^m$, the fixed vertical scale $12^m$, the slider 20 and the swinging hypotenuse member 25 are employed as before, and the edge $25^a$ of the hypotenuse member is used in making the determinations. The frame member 1 of the device is in this instance provided with a curved guide, for example a slot G, for cooperation with the follower member, for example a pin $40^a$ carried by the hypotenuse member. The guide curve G may be obtained as follows:

From successive graduations on the fixed vertical scale lines are drawn to points on the horizontal scale corresponding to the mantissae of the logarithms of the numbers represented by the successive graduations. For example from the number 4 on the vertical scale the dotted line $x$ is drawn to the point 0.6021 on the horizontal scale,—from the number 9 on the vertical scale the dotted line $y$ is drawn to the point 0.9542 on the horizontal scale, etc. Since the logarithm of the number 1 is zero, one scale unit must necessarily be the constant entering into the construction of the curve in order that the proper relation may be shown by the curve when the latter passes through zero. Accordingly a distance of one scale unit is measured off on each of the lines $x$, $y$, etc. from the vertical scale and a line connecting these points $x'$, $y'$, etc. thus determined, gives the desired smooth curve. The follower pin $40^a$ of the hypotenuse member $25^a$ is placed at a distance equalling one unit of the scale $12^m$ from its pivot point, such pivot point moving along the vertical scale.

In using this device it is merely necessary to set the index of the slider at a selected number on the vertical scale and to read the intersection of the lower edge $25^a$ of the hypotenuse member with the lower scale, the reading on the horizontal scale at such intersection then directly giving the mantissa of the logarithm of the number to which the index of the slider has been set. Reversing the process, a setting of the hypotenuse on the horizontal scale indicating a given mantissa of the logarithm of a number, the required number may be read on the vertical scale.

The readily obtained logarithmic results as above described enable the performance of rapid and easily accomplished arithmetical operations, such as multiplication, division, and powers and roots of numbers.

While in the above discussion, and in the drawings, certain scale dimensions and units have been employed for convenience in description, it is to be understood that the invention is not necessarily limited thereby, and that any desired scale units may be employed such as will facilitate the ready setting of the instrument and the reading of the result.

I claim:

1. Calculating apparatus of the class described comprising a frame portion having relatively fixed vertical and horizontal graduated scale members with edge portions at right angles to each other, a slider movable along the vertical scale, and a swinging graduated hypotenuse pivotally connected to the slider, a square having horizontal and vertical legs and a diagonal member, the latter member having a scale thereon and being arranged to bisect the right angle between the horizontal and vertical fixed scales, said scales being divided into even portions to afford similar arithmetic graduations, the diagonal of the movable square being graduated to indicate the squares of the graduations upon the vertical and horizontal fixed scales.

2. A calculating device of the class described comprising a frame of generally right triangular form, having a horizontal scale and a vertical scale at right angles to each other, a slider movably mounted upon the frame to slide along the vertical scale, a swinging hypotenuse member, a pivotal connection between the hypotenuse member and the slider, said pivotal connection having its axis at the intersection of a vertical line through the zero marking of the horizontal scale and a horizontal index mark upon the slider, whereby a horizontal line through the zero of the horizontal scale;—a line along the hypotenuse intersecting said axis;—and said vertical line of said zero define a right triangle; and a square comprising a vertical leg, a horizontal leg, and a diagonal member, said diagonal member having a scale and extending along the bisector of the right angle of the said triangle, said diagonal scale being graduated to indicate at its point of contact with the zero marking of the horizontal scale the squares of numbers indicated by graduations upon the vertical and horizontal scales at points where the legs of the small square intersect these scales respectively.

3. A calculating device of the class described comprising a generally planar frame portion having fixed horizontal and vertical scales extending at right angles to each other, a slider movable over the vertical scale and having a hair line to afford a ready reading on the vertical scale, a hypotenuse having a scale thereon, a pivotal connection between said hypotenuse and slider, said connection affording an axis about which the hypotenuse may swing, said axis being located at the intersection of an extension of said hair line and an extension of the zero end graduation of the horizontal fixed scale, whereby the scale upon the hypotenuse, the fixed scale, and the vertical line extending through said zero marking define a right triangle; a diagonal member having a sliding connection with the fixed frame and having a scale line which always bisects the right angle of said triangle, the end of said diagonal member being contactible with the hypotenuse, said fixed scales being evenly divided to provide graduations and said diagonal member being provided with indicia to show the squares of numbers upon the fixed scales.

4. A calculating device of the class described comprising a generally planar frame portion having fixed horizontal and vertical scales extending at right angles to each other, a slider movable over the vertical scale and having a hair line to afford a ready reading on the vertical scale, a hypotenuse member having a scale thereon, a pivotal connection between said hypotenuse member and slide, said connection affording an axis about which the hypotenuse member swings, said axis being located at the intersection of an extension of said hair line and a vertical line through the zero end of the horizontal fixed scale, whereby the scale upon the hypotenuse, the fixed scale and said vertical line define a right triangle; a sliding member having a sliding connection with the fixed frame portion and including a part provided with a diagonal scale line and graduations adjoining said line, said diagonal line being arranged to bisect the right angle of said triangle, said sliding member including a leg having an index line extending at right angles to the length of one of said fixed scales, the scale upon said diagonal part being graduated to indicate the squares of numbers upon one of said fixed scales as designated by the position of the edge of said index line of the leg.

5. A calculating device of the class described comprising a frame having fixed horizontal and vertical scales extending at right angles to each other, a slider movable over the vertical scale and having a hair line to afford a ready reading on the vertical scale, a hypotenuse member having a scale along its inner edge, a pivotal connection between said hypotenuse member and slide, said connection affording an axis about which the hypotenuse member swings, said axis being located at the intersection of an extension of said hair line and a vertical line through the zero end of the horizontal fixed scale, whereby the inner edge of the hypotenuse,—the fixed scale,—and said vertical line define a right triangle; a sliding member having a sliding connection with the fixed frame and including a diagonal part with a scale line and graduations adjoining said line, said scale line being arranged to bisect the right angle of said triangle, said member including a leg having an edge portion extending at right angles to the direction of extent of one of said fixed scales, the scale of the diagonal part being graduated to indicate the squares of numbers on one of the fixed scales as indicated by corresponding positions of the leg, and a scale slidably supported upon said fixed portion adjoining the last-named fixed scale, said sliding scale having graduations similar to those of the fixed scale and being movable with the leg of said sliding member so that its zero point corresponds to the point of intersection of the edge portion of said leg with the fixed scale.

6. A calculating device of the class described comprising a frame, a fixed horizontal scale upon said frame having graduations affording even divisions of the scale and having a zero end, a fixed vertical scale similarly divided into graduations and having a zero graduation in alignment with the edge of the horizontal scale but spaced therefrom, a slider movably mounted upon the fixed supporting portion and slidable along the vertical scale, said slider having an index to facilitate an accurate reading upon the vertical scale, a swinging hypotenuse member, a pivotal connection between the slider and said hypotenuse member, said pivotal connection affording an axis at the intersection of a horizontal line extending from said part of the slider, and a vertical line extending from the zero end of the horizontal scale, whereby said vertical line, the inner edge of the hypotenuse member, and the upper edge of the horizontal scale define a right triangle,—sliding scales disposed adjoining the horizontal and vertical scales, respectively, and similarly graduated, and a sliding square having horizontal and vertical legs with their outer edges intersecting the sliding scales at their zero points, and means causing the movement of the sliding scales in response to a movement of the square, said square having a diagonal member extending between the zero ends of the fixed horizontal and vertical scales and having an edge portion contacting the upper edge of the horizontal scale at its zero marking, the diagonal part of said square having graduations thereon corresponding to the squares of numbers designated upon the horizontal and vertical scales so that the square of any number intersected by the edge of one of the legs of the square upon one of the fixed scales may have its square indicated at the point of contact of said diagonal part and the upper edge of the fixed scale.

7. Apparatus useful in solving algebraic expressions of the form $$x = \frac{a^2}{d-a},$$

said apparatus comprising two parts carrying fixed scale lines at right angles to each other, a sliding scale associated with each fixed scale, a slider movable along one fixed scale, a hypotenuse member carried by the slider, and a square movable along the bisector of the angle between said fixed scale lines, said square having a scale graduated to indicate squares of numbers on the fixed scales.

8. Apparatus of the class described comprising a frame having a main portion of right triangular contour and a pair of scale members arranged to extend along those edges of said triangular member which are at right angles to each other, means hinging said scale members together at their intersection in such a manner that when said members are disposed in the same plane they will necessarily be at right angles to each other, and means for removably securing said scale members to the triangular member.

9. Apparatus of the class described comprising a pair of elongate members disposed in substantially the same plane and provided, respectively, with fixed scales, said scales being at right angles to each other, a rigid plate of right-triangular shape arranged to fit within the angle between said elongate scale members, said plate and scale members having interfitting parts, respectively, for accurately positioning them in predetermined assembled relation, a guide member carried by the plate, a slider movable along one of said scales, said slider having an index line for registry with graduations of the scale along which it moves, means providing a pivotal axis in line with said index, a hypotenuse member arranged to swing about said axis, a follower carried by the hypotenuse and adapted to cooperate with said guide member for determining the angular position of the hypotenuse, and means detachably uniting the plate to the elongate scale members.

10. Apparatus of the class described comprising guideways disposed at right angles to each other, sliding scales mounted in the respective guideways, each of said sliding scales having an abutment element in line with its zero point, and a square movable along the bisector of the right angle and having legs engageable with said abutment element for simultaneously moving the sliding scales.

11. Apparatus of the class described comprising a frame providing guideways disposed at an angle to each other, sliding scale members disposed in the respective guideways, and a member moving in a path extending through the vertex of the angle between said guideways, said member and the respective scales having cooperating parts operative as said member is moved to cause the slide simultaneously to move along their guideways.

12. Apparatus of the class described comprising a frame carrying a pair of fixed scales disposed at right angles to each other, a sliding scale arranged substantially parallel to one of the fixed scales, a slider movable along the latter fixed scale, said slider having an index for registry with selected graduations of the fixed scale, and means for selectively connecting said slider to various parts of the sliding scale.

13. Apparatus of the class described comprising a frame having guideways for a plurality of graduated slides, graduated slides in the respective guideways, and means for simultaneously moving said slides in accordance with a predetermined ratio of movement.

14. Apparatus of the class described comprising a frame provided with a pair of fixed scales disposed at right angles to each other, a sliding scale substantially parallel to and adjacent each of the fixed scales, a square movable along a line making a 45° angle with one of said fixed scales, said square having legs disposed perpendicular to the respective fixed scales, each leg having an index line for cooperating with graduations of the fixed scale which it intersects, and means carried by each sliding scale for actuation by a leg of the square, whereby upon movement of said square, said sliding scales are concomitantly moved.

15. Apparatus of the class described comprising a frame having a pair of fixed scales disposed at right angles to each other, a slider movable along one of the said scales, a hypotenuse member pivoted to said slider, and a member movable along a line making a 45° angle with one of said scales, said member having graduations thereon, the zero graduation being adapted to be brought into engagement with said hypotenuse member.

16. Apparatus of the class described comprising a frame having a fixed scale thereon, a slide member arranged to slide in a path making a 45° angle with said scale, said sliding member having a part extending perpendicular to the scale, said part having an index line for use in reading its position relative to the scale, and the slide member having graduations indicating squares of the numbers thus read upon the fixed scale.

17. Apparatus of the class described comprising a frame provided with a pair of fixed scales at right angles to each other, a slider movable along one of said scales, a sliding scale substantially parallel to and adjacent each of the fixed scales, a swinging hypotenuse member pivoted to the slider, a guideway provided by the frame and extending at an angle of 45° to one of said scales, a part slidable along said guideway and engageable with the hypotenuse, and a diagonal scale associated with the guideway and arranged to indicate readings of values equal to the squares of correspondingly spaced readings upon one of the other scales.

18. Apparatus of the class described comprising a frame provided with a pair of fixed scales at right angles to each other, a slider movable along one of said scales, a sliding scale substantially parallel to and adjacent each of the fixed scales, a swinging hypotenuse member pivoted to the slider, a guideway provided by the frame and extending at an angle of 45° to one of said scales, a part slidable along said guideway and engageable with the hypotenuse member, and a diagonal scale associated with the guideway and arranged to indicate readings of values equal to the squares of correspondingly spaced readings upon one of the other scales and means extending from the guideway at right angles to the fixed scales to facilitate comparison of the square values on the diagonal scale and the corresponding readings on the other scales.

19. Apparatus of the class described comprising a frame provided with a pair of fixed scales at right angles to each other, a slider movable along one of said scales, a sliding scale substantially parallel to and adjacent each of the fixed scales, a swinging hypotenuse member pivoted to the slider, a guideway provided by the frame and extending at an angle of 45° to one of said scales, a part slidable along said guideway and engageable with the hypotenuse member, a diagonal scale associated with the guideway and arranged to indicate readings of values equal to the squares of correspondingly spaced readings upon one of the other scales, and legs extending from said part and disposed at right angles to each other to provide edges extending over the fixed scales thus to facilitate comparison of the square values on the diagonal scale and corresponding values on the fixed scales.

20. Apparatus of the class described comprising a frame provided with a pair of fixed scales disposed at right angles to each other, a sliding scale substantially parallel to and adjacent each of the fixed scales, and a square movable along a line making a 45° angle with one of said fixed scales, said square having legs disposed perpendicular to the respective fixed scales, each leg having an index line for cooperating with graduations of the fixed scale which it intersects.

21. Apparatus of the class described comprising a frame provided with a pair of fixed scales at right angles to each other, a slider movable along one of said scales, a sliding scale substantially parallel to and adjacent each of the fixed scales, a swinging hypotenuse member pivoted to the slider, a guideway provided by the frame and extending in angular relation to and between said fixed scales, a part slidable along said guideway and engageable with the hypotenuse, a diagonal scale associated with the guideway and means extending from the guideway to the region of the fixed scales to facilitate ready comparison of readings of values on either of said fixed scales and said diagonal scale, said means cooperating with the fixed scales in defining a rectangle, the means cooperating with the adjoining portion of the fixed scales and with sections of the hypotenuse at either side of the point of engagement of said part to define two smaller triangles.

22. Apparatus of the class described comprising supporting means provided with a pair of fixed scales disposed at right angles to each other, a graduated scale member slidable along one at least of said fixed scales, said sliding scale member having an abutment element in line with its zero point, guide means for said sliding scale member, a movable square having elongate datum lines disposed at right angles to each other and intersecting the fixed scales, respectively, and means guiding said square for bodily movement along the bisector of the right angle between said fixed scales, said square having a part coincident with one of its datum lines and engageable with the abutment of the sliding scale member whereby to move the latter simultaneously with movement of the square.

23. A calculating device of the class described comprising a frame of generally right-triangular form having a horizontal scale and a vertical scale fixedly disposed at right angles to each other, a slider movably mounted upon the frame to slide along one of said scales, a swinging hypotenuse member, a pivotal connection between the hypotenuse member and the slider, said pivotal connection having its axis at the intersection of a line parallel to the path of the slider and passing through the zero marking of the scale which extends at right angles to said path and an index mark upon the slider, the hypotenuse member having a graduated datum line intersecting said axis, and a movable part comprising a vertical datum line and a horizontal datum line said lines being arranged to intersect the horizontal and vertical scales in all positions of the movable part, the movable part also having a diagonal graduated scale line extending along the bisector of the right angle between the horizontal and vertical scales, said diagonal scale line being graduated to indicate at its point of contact with the zero marking of one of said fixed scales the squares of numbers indicated by graduations upon the vertical and horizontal squares at points where the datum lines of the square intersect said scales respectively.

24. A calculating device of the class described comprising an inner rigid member of substantially right-triangular shape and a pair of leg members extending along those edges of the inner member which meet at the right angle, the outer ends of the leg members being diagonal and in substantial alignment with the hypotenuse of the inner member, means detachably uniting the leg members to the inner member and a hinge uniting the adjacent ends of the leg members, the axis of the hinge substantially bisecting the right angle of the inner member.

25. Apparatus of the class described comprising a frame provided with a pair of graduated fixed scales disposed at right angles to each other, an additional fixed scale parallel to one of said pair of scales and graduated to afford readings of squares of numbers indicated by the graduations on the parallel fixed scale, a sliding scale substantially parallel to and adjacent each of the fixed scales, and a square movable along a line making a 45° angle with one of said fixed scales, said square having legs disposed perpendicular to the respective fixed scales, each leg having an index lines for cooperating with graduations of the fixed scale which it intersects.

BARRETT R. WELLINGTON.